United States Patent
Frelechoux

(10) Patent No.: US 9,015,815 B2
(45) Date of Patent: Apr. 21, 2015

(54) METHOD AND SYSTEM FOR AUTHENTICATING A NETWORK NODE IN A UAM-BASED WLAN NETWORK

(71) Applicant: Togewa Holding AG, Bern (CH)

(72) Inventor: Laurent Frelechoux, Lausanne (CH)

(73) Assignee: Togewa Holding AG, Bern (CH)

( * ) Notice: Subject to any disclaimer, the term of this patent is extended or adjusted under 35 U.S.C. 154(b) by 0 days.

(21) Appl. No.: 14/272,851

(22) Filed: May 8, 2014

(65) Prior Publication Data

US 2014/0245410 A1    Aug. 28, 2014

Related U.S. Application Data

(63) Continuation of application No. 13/059,898, filed as application No. PCT/EP2009/054118 on Apr. 7, 2009, now Pat. No. 8,806,587.

(51) Int. Cl.
*G06F 7/04* (2006.01)
*G06F 15/16* (2006.01)
(Continued)

(52) U.S. Cl.
CPC ...... *H04L 9/32* (2013.01); *H04L 63/08* (2013.01); *H04L 63/162* (2013.01);
(Continued)

(58) Field of Classification Search
CPC ..... H04L 63/08; H04L 63/162; H04L 63/166; H04W 12/06; H04W 84/12; H04W 74/004; H04W 80/04
USPC .......................................................... 726/5
See application file for complete search history.

(56) References Cited

U.S. PATENT DOCUMENTS

2005/0114680 A1    5/2005    Chinnaswamy et al.

2006/0195893 A1    8/2006    Caceres et al.
(Continued)

FOREIGN PATENT DOCUMENTS

GB    2 407 940 A    5/2005

OTHER PUBLICATIONS

International Search Report issued Jan. 29, 2010, in PCT/EP2009/054118.
(Continued)

*Primary Examiner* — Kambiz Zand
*Assistant Examiner* — Benjamin Kaplan
(74) *Attorney, Agent, or Firm* — Oblon, McClelland, Maier & Neustadt, L.L.P.

(57) ABSTRACT

The invention relates to a method and system for authenticating a mobile network node in a Wireless Local Area Network, wherein the mobile network node requests access to the WLAN at an access point. Within a closed first network region, before authentication all network protocol layers up to the Layer 3 protocol layer (L3) are set up. An authenticator based on Extensible Authentication Protocol (EAP) is generated on the Web server as captive portal and the Layer 3 protocol layer between the authenticator and the mobile network node comprising an EAP peer is extended bidirectionally by means of a defined bit sequence. In case of an access request, the Web server transmits an authentication stimulus to the mobile node by encoding an EAP message request and transmitting it in the Layer 3 protocol layer by means of the defined bit sequence. The mobile node decodes the EAP message request and transmits, in the Layer 3 protocol layer, by means of the defined bit sequence, an encoded EAP response message to the authenticator, the EAP response message comprises authentication data of the mobile network node. The Web server decodes the EAP response message from the bit sequence, transmits it to an AAA server including an EAP server by means of an authentication inquiry. On the basis of an authentication response by the AAA Server, access is enabled to a second network region for use by the mobile network node by means of a Network Access Server.

23 Claims, 6 Drawing Sheets

(51) Int. Cl.
*G06F 17/30* (2006.01)
*H04L 29/06* (2006.01)
*H04L 9/32* (2006.01)
*H04W 12/06* (2009.01)
*H04W 74/00* (2009.01)
*H04W 80/04* (2009.01)
*H04W 84/12* (2009.01)

(52) U.S. Cl.
CPC ............ *H04L 63/166* (2013.01); *H04W 12/06* (2013.01); *H04L 63/0892* (2013.01); *H04W 74/004* (2013.01); *H04W 80/04* (2013.01); *H04W 84/12* (2013.01)

(56) References Cited

U.S. PATENT DOCUMENTS

| | | |
|---|---|---|
| 2006/0215701 A1 | 9/2006 | Fenelon |
| 2007/0055752 A1 | 3/2007 | Wiegand et al. |
| 2008/0181187 A1 | 7/2008 | Scott et al. |
| 2008/0310366 A1 | 12/2008 | Oba et al. |
| 2010/0046434 A1 | 2/2010 | Weniger et al. |

OTHER PUBLICATIONS

B. Anton, et al., "Best Current Practices for Wireless Internet Service Provider (WISP) Roaming", Wireless ISP Roaming, XP-002963834, Feb. 1, 2003, pp. 1-37.

Stephen McCann, et al., "Novel WLAN Hotspot Authentication", Internet Citation, [Online], XP-002333409, Jun. 27, 2005, pp. 59-63.

H. Wang, et al., "Security Mechanisms and Security Analysis: Hotspot WLANs and Inter-Operator Roaming", Vehicular Technology Conference, vol. 5, XP-010766706, May 17, 2004, pp. 2492-2496.

Rafa Marin Lopez, et al., "A Fast Heterogeneous Handover Architecture based on an extended EAP lower-layer", 16$^{th}$ Ist Mobile and Wireless Communications Summit, 2007 IEEE Piscataway, NJ,. USA., XP-031132612, Jul. 1, 2007, pp. 1-5.

White Paper, 802.1X: Port-Based Authentication Standard for Network Access Control (NAC) A Secure, Strong and Flexible Framework for Network Access Control (NAC) Copyright © 2010, Juniper Networks, Inc.

METHOD AND SYSTEM FOR AUTHENTICATING A NETWORK NODE IN A UAM-BASED WLAN NETWORK

CROSS-REFERENCE TO RELATED APPLICATION

This application is a continuation of U.S. application Ser. No. 13/059,898, filed Feb. 18, 2011, the contents of which are incorporated herein by reference in its entirety. U.S. application Ser. No. 13/059,898 is a national stage application of PCT/EP2009/054118, filed on Apr. 7, 2009.

The invention presented here relates to a method and system for authentication of a mobile network node in a Wireless Local Area Network (WLAN) or in other packet data networks. Via a wireless network interface (NIC), the mobile network node requests access to the WLAN at an Access Point (AP), wherein, within a closed first network region (Walled Garden), before authentication by means of the mobile network node all network protocol layers up to the Layer 3 protocol layer (L3) are set up. Between a Web server as a captive portal and the mobile network node, messages containing authentication data of the mobile network node are transmitted in the Layer 3 protocol layer using Universal Access Method (UAM). If the authorization is successful, a Network Access Server (NAS) enables access for the mobile network node to a second network region. Most especially the invention relates to a method for mobile network nodes comprising a SIM card (subscriber identity module) with authorization and authorization data, as e.g. an IMSI (International Mobile Subscriber Identity) and software certificate (e.g. SSL certificates) based authorization.

BACKGROUND OF THE INVENTION

Nowadays, Wireless Internet Service Providers (WISP) play an important role in providing fixed or mobile wireless services to the customers. Using Wi-Fi or other wireless methods, WISPs provide Internet access in public places such as airports, hotels, restaurants, shopping centers, etc. Wi-Fi is a certification trademark of the Wi-Fi Alliance for products based on the IEEE (Institute of Electrical and Electronics Engineers) 802.11 standards. For the implementation of a public Wireless Internet service, WISPs can use mobile WiMAX (Worldwide Inter-operability for Microwave Access, e.g. IEEE 802.16 standard) for example based on EAP authentication (IETF RFC 3748), WLANs based on the IEEE 802.1x standard or WLANs based on WISPr and UAM (Universal Access Method) with the IEEE 802.11 standard to deliver Internet access to customers all over the world. UAM is a method to allow a subscriber access to a WLAN network, as e.g. a Wi-Fi network, whereby only an Internet browser is used. The Internet browser opens with a login page in which the user has to fill in his credentials (usually username and password) before he is granted access to the network. Beside authentication and authorization of the customers, the WISPs also provide web payment service for example for digital content. Such web payment services can be billed to Internet service provider (ISP), telephone company or credit card accounts. WISPs often also supports micropayments to charge the account at the end of the month.

In the state of the art, access authentication and authorization to Public WLAN is predominantly based on the mentioned UAM and WISPr, both being HTTP based and therefore requiring the mobile device to gain IP access to the infrastructure (see FIG. 2). UAM and WISPr are solely provisioned for username/password authentication, not for SIM or certificates based authentication. Therefore there are serious obstacles when realizing real roaming based on today's UAM and WISPr, e.g. operators are forced to use username/password if they want roaming, which is very inconvenient for certain type of operators (e.g. GSM) that are used to work with smart cards. On the other side, mobile WiMAX is based on EAP authentication, an IETF (Internet Engineering Task Force) defined standard that generically supports username/password, SIM (subscriber identity module) or smart card and certificate based authentication (see FIG. 1). EAP based authentication is today possible on WLAN by using the IEEE 802.1x standard. 802.1x is however not compatible with UAM and WISPr access. An operator that wants to sell subscription less access to its network (i.e. instant access with payment by credit card) needs the UAM method. An operator that wants to supports both EAP and UAM must therefore have a dual infrastructure that broadcast e.g. two SSIDs (Service Set Identifier), and is a rather cost-intensive investment. As mentioned, IEEE 802.1x can be used for authentication of a user within a wireless LAN. 802.1x is an open source IEEE protocol from the Institute of Electrical and Electronics Engineers Standards Association. The IEEE 802.1x authentication permits authenticated access to IEEE 802 media such as, for example, Ethernet, Token Ring and/or 802.11 wireless LAN. The 802.11 protocol generates for wireless LAN, i.e. for wireless local networks, a 1 Mbps, 2 Mbps or 11 Mbps transmission in the 2.4 GHz band, whereby either FHSS (Frequency Hopping Spread Spectrum) or DSSS (Direct Sequence Spread Spectrum) is used. For authentication, 802.1x supports authentication EAP (Extensible Authentication Protocol) and EAP-TLS (Wireless Transport Layer Security, RFC 2716 (PPP EAP TLS Authentication Protocol)). As a generic authentication scheme, EAP hides to the visited network the type of credentials that are being used by the home operator. Implementation of EAP include EAP-SIM (EAP for Global System for Mobile Communications (GSM) Subscriber Identity Module (SIM), RFC 4186), EAP-AKA (Extensible Authentication Protocol Method for UMTS Authentication and Key Agreement, RFC4187), EAP-TLS, EAP-TTLS (EAP-Tunneled Transport Layer Security). 802.11 also supports RADIUS. Although the RADIUS support is optional in 802.1x, it is to be expected that most of the 802.1x authenticators will support RADIUS. The IEEE 802.1x protocol is a so-called port-based authentication protocol. It can be used in every environment in which a port, i.e. the interface of a unit, can be specified. With the authentication based on 802.1x, three units can be differentiated: the unit of the user (supplicant/client), the authenticator and the authentication server. It is the role of the authenticator to authenticate the supplicant. Authenticator and supplicant are connected, for example, via a point-to-point LAN segment or a 802.11 wireless LAN. Authenticator and supplicant have a defined port, a so-called Port Access Entry (PAE), which defines a physical or virtual 802.1x port. The authentication server generates the authentication services required by the authenticator. In this way it verifies the entitlement data supplied by the supplicant regarding the assumed identity.

UAM authentication to access a wireless network is based on the concept of a "Walled Garden", as shown in FIG. 2. A walled garden is a "reversed" intranet that prevents a device connected within the walled garden from accessing the Internet prior to being authenticated. This technique, unlike 802.1x, allows the device to bring up all networking layers, including layer 3 (i.e. IP layer) prior to being authenticated and charged for the session. The interest of this technique is that a Web server in the walled garden can be used to perform different types of authentication, including authentication via browser and payment by credit card (not possible with 802.1x). UAM authentication is very popular because of this possibility of paying directly at a hotspot without the need of a subscription.

WISPr (Wireless Internet Service Provider roaming) is a Web based login standard (UAM) for client software. WISPr 1.0 was released in February 2003 by the Wi-Fi Alliance. Annex D of the WLAN recommendation describes an XML over HTTP protocol between client software on a personal computer (PC) or mobile phone to allow a username/password authentication toward a Wi-Fi hotspot. The protocol consists of an exchange of XML elements (similar to the Simple Object Access Protocol (SOAP)) in which the client (i.e. the software on the mobile device) exchanges information with a Web server (the WLAN hotspot) to open a WLAN session and later on to terminate a WLAN session. XML (eXtensible Markup Language) is a format and grammar to structure data, specified by the W3C consortium. SOAP is a remote procedure call protocol working over XML, also specified by the W3C consortium (World Wide Web Consortium). FIGS. 2 and 5 shows the state of the art according to WISPr specification Annex D. The client in FIG. 5 comprises the client software. The Gateway is the WISPr server 23 (FIG. 2) on the visited WLAN network. The AAA is the authentication server 22 at the home operator. WISPr defines the leg (see FIG. 5) between Client 10 and Gateway 23. The leg between Gateway 23 and AAA 22 is Radius or Diameter. In the state of the art, the authentication servers are usually based on RADIUS (Remote Authentication Dial-In User Service) of the IETF (Internet Engineering Task Force). The use of the RADIUS authentication protocol and accounting system is widespread in network units such as, for example, routers, modem servers, switches, etc., and is used by most Internet service providers (ISPs). If a user dials into an ISP he/she has to enter normally a user name and password. The Radius server verifies this information, and authorizes the user for access to the ISP system. The reason for the widespread use of RADIUS lies among other things in that network units cannot generally cope with a large number of network users each with different authentication data, since this would exceed, for example, the storage capacity of the individual network units. RADIUS permits the central administration of a multiplicity of network users (addition, deletion of users, etc.). This is therefore a necessary prerequisite of the ISPs (Internet Service Providers) for their service because their number of users often amounts to several thousand to several tens of thousands. RADIUS further generates a certain permanent protection against hackers. The remote authentication by RADIUS based on TACACS+(Terminal Access Controller Access Control System+) and LDAP (Lightweight Directory Access Protocol) is relatively secure against hackers. Many other remote authentication protocols, in contrast, have only temporary or insufficient or no protection against hacker attacks at all. Another advantage is that RADIUS is at present the de-facto standard for remote authentication, RADIUS also being supported by nearly all systems, which is not the case for other protocols.

In the state of the art, the WISPr specification defines a XML scheme used to submit the user credentials, poll for the authentication result, etc. It should be noted that induced by shortcomings through new demands in wireless technology the Wireless Broadband Alliance is looking at further developing the WISPr standard. At the present time, WISPr Annex D is a de-facto standard in the WLAN telecom industry. It is estimated that over 90% of the commercial hotspots networks implement WISPr Annex D as an access method. In connection with WISPr, IPASS has to be mentioned. IPASS is a commercial company that unifies the management of remote and mobile devices and connectivity. IPASS has been a key contributor to the WISPr specification. IPASS had fore a long time its own proprietary scheme called GIS (Generic Interface Specification). WISPr is more or less a copycat of GIS.

The Extensible Authentication Protocol (EAP) (RFC 3748) was developed by the IETF (Internet Engineering Task Force) to create a generic authentication protocol that supports different type of credentials (username/password, certificates, SIM cards, etc.). EAP was invented to allow a generic support of authentication on a visited network without having to worry and update the infrastructure each time that a new authentication is used. The Extensible Authentication Protocol (EAP) is in reality an extension of the PPP (Point-to-Point Protocol) and is defined by the Request for Comments (RFC) 2284 PPP Extensible Authentication Protocol (EAP) of the IETF. By way of PPP a computer can be connected to the server of an ISP, for example. PPP works in the data link layer of the OSI model, and carries the IP packets of the computer to the server of the ISP that forms the interface to the Internet. In contrast to the older SLIP protocol (Serial Line Internet Protocol), PPP functions more stably and has error correction facilities. As mentioned, the extensible authentication protocol EAP is a protocol on a very general level that supports diverse authentication methods such as, for example, token cards, Kerberos of the Massachusetts Institute of Technology (MIT), strike off passwords, certificates, public key authentication and smart cards or the so-called Integrated Circuit Cards (ICC). IEEE 802.1x defines the specifications such as EAP that must be integrated into LAN frames. With communication in wireless networks via EAPs, a user requests from an access point, via wireless communication, i.e. a connection hub for the remote access client or supplicant to the WLAN, access to the wireless LAN. The AP then requests from the supplicant the identification of the user, and transmits the identification to the above-mentioned authentication server, that is based, for example, on RADIUS. The authentication server allows the Access Point to recheck the identification of the user. The AP collects this authentication data from the supplicant and transmits these to the authentication server, which terminates the authentication method. EAP is the chosen method for WiMAX authentication. The 3rd Generation Partnership Project (3GPP) has also adopted this standard for the convergence of GSM (Global System for Mobile communications) to the IP (Internet Protocol) technology. EAP is encapsulated in the mentioned "transport" protocols: PPP (Point-to-Point Protocol, IETF RFC), Radius (RFC 2869) and Diameter as computer networking protocol for AAA (Authentication, Authorization and Accounting). A secure version of the IEEE 802.11 standard (WLAN), called 802.1x, uses EAP as an authentication mechanism. Very few WLAN hotspot networks have however deployed 802.1x because this method inherently prevents a user from purchasing an Internet access via credit card (i.e. it is not possible to offer a UAM access over 802.1x). A few operators in the state of the art, such as Swisscom, have deployed a dual infrastructure that offers both UAM over 802.11 and EAP over 802.1x. This is achieved by broadcasting two signals and having a dual infrastructure. This option is however costly and many operators that have today UAM over 802.11 are reluctant to upgrade to a dual infrastructure because of the costs.

EAP was originally designed to run over PPP (Point to Point Protocol) with the limitation of a single IP hop between the device and the NAS. To overcome this limitation, L2TP was specified (RFC 2661, RFC 3931). L2TP emulates a link segment over an IP network, providing a PPP layer over multiple IP hops. L2TP (Layer Two (2) Tunneling Protocol) is an extension to the PPP protocol that enables Internet service providers (ISP) to operate Virtual Private Networks (VPNs). L2TP merges the features of two other tunneling protocols: PPTP (Point-to-Point Tunneling Protocol) from Microsoft and L2F (Layer Two Forwarding) from Cisco Systems. Like PPTP, L2TP requires that the ISP's routers support the protocol. L2TP can be used as an alternative to an EAP over WISPr. This would however require that the device implements L2TP and that the NAS (Network Access Server) implements L2TP. All traffic between the device and the NAS would then be tunneled, increasing the overhead. The software changes in the client software and the NAS would be a lot more significant than for the proposed invention. The NAS is the access gateway between an external communications network and an internal network, also referred to as "walled garden". The Internet service providers (ISP) use the NAS to give access to the Internet after the user has been authorized by the access server, when he requests access to the network.

Other firms as Comfone AG and Service Factory AB have developed in 2004 a solution that allows a two-phase EAP type of authentication over a WISPr enabled hotspot (see FIG. 6). The two-phase scheme of this technical solution is illustrated in FIG. 6, with a first phase comprising an EAP authentication process. A one-time username/password is generated out of this phase, and the client software then proceeds with a normal WISPr login to open the WLAN session. FIG. 6 illustrates such a WISPr EAP authentication. This method has different drawbacks: First, there is a need for a special configuration at the WISP network to allow phase 1 authentication prior to the standard phase 2 authentication. Second, there is a need for the client software to implement a proprietary phase 1 protocol. Third, the two-phase approach introduces additional delay in the authentication.

SUMMARY OF THE INVENTION

With the coming of mobile WiMAX there is a need of inter-technology roaming, so that a WiMAX subscriber may roam on a WLAN hotspot with the same credentials. While this is today possible if the credentials are a username and password, there is not easy convergence if the credentials are a SIM or certificates. The WISPr EAP-SIM method (SIM authentication over the EAP protocol. IETF RFC 4186) that was developed suffers the complexity and drawbacks mentioned above.

It is the object of this invention to propose a new method for mobile nodes roaming in WLANs. In particular, it should be made possible for a WiMAX subscriber respectively for a subscriber using EAP for authentication to roam on a WLAN hotspot with the same credentials. This should be also possible if the credentials are a SIM or certificates. It should be made possible for the user to move between different hot spots and standards without any difficulty (roaming), without having to bother about registering, billing, service authorization etc. at the various WLAN service providers. Also in Wi-Fi hotspots, the invention shall guarantee for the user and service provider in WLANs the required components for billing, service authorization and security.

These objects are achieved according to the present invention through the elements of the independent claims. Further preferred embodiments follow moreover from the dependent claims and from the specification.

These objects are achieved through the invention in particular in that for authenticating a mobile network node in a Wireless Local Area Network (WLAN), the mobile network node requests access to the WLAN at an access point via a wireless network interface, wherein, within a closed first network region (walled garden), before authentication, by means of the mobile network node all network protocol layers up to the Layer 3 protocol layer (L3) are set up, wherein, between a Web server as a captive portal and the mobile network node messages containing authentication data of the mobile network node are transmitted in the Layer 3 protocol layer using Universal Access Method (UAM), and if the authorization is successful, a Network Access Server (NAS) enables access for the mobile network node to a second network region, wherein an authenticator based on Extensible Authentication Protocol (EAP) is generated on the Web server and/or network access server (NAS), the Layer 3 protocol layer between the authenticator and the mobile network node comprising an EAP peer being extended bidirectionally by means of a defined bit sequence containing encoded EAP messages, wherein in the case of an access request by the mobile network node, the Web server transmits an authentication stimulus to the mobile network node by encoding an EAP message request for the Layer 3 protocol layer and transmitting in the Layer 3 protocol layer the encoded message request by means of the defined bit sequence, wherein the mobile network node decodes the EAP message request from the defined bit sequence and transmits in the Layer 3 protocol layer by means of the defined bit sequence an encoded EAP response message to the authenticator, the EAP response message comprises authentication data of the mobile network node, and wherein the Web server decodes the EAP response message from the bit sequence, transmits it to an AAA server by means of an authentication inquiry, and on the basis of an authentication response by the AAA Server, by means of the Network Access Server (NAS), enables the second network region for use by the mobile network node. The authentication inquiry between Web Server comprising the EAP authenticator and AAA Server comprising the EAP server can for example be realized by a RADIUS or DIAMETER protocol layer. The authentication data can for example comprise an identity (ID) reference and/or password and/or hash value and/or IMSI of a SIM card. The medium access can for example be generated in the Layer 2 protocol layer (L2), whereas access to the physical Layer 1 (L1) can e.g. be generated based on an 802.11 WLAN network. The Layer 3 protocol layer can be implemented based on the WISPr structure. The mentioned variant has the advantage among other things that the WISPr protocol layer can be extended to allow the transport of EAP authentication in particular without requiring a major upgrade of the network operators' infrastructure. It proposes a technical solution for mobile WiMAX subscriber roaming onto a WLAN network, as the same EAP authentication can be used on Wi-Fi. The invention has further the advantage that there is no need for a special configuration at the WISP network to allow phase 1 authentication prior to the standard phase 2 authentication, and no need for the client software to implement a proprietary phase 1 protocol, and no additional delay in the authentication introduced by the two-phase approach as it is known from the two phase scheme with first EAP authentication and then normal WISPr login of the prior art. Additionally, there is no need for a costly upgrade to dual infrastructure with UAM over 802.11 and EAP over 802.1x. Further the invention has the advantage that with the increasing use of mobile WiMAX, an inter-technology roaming can be provided, so that a WiMAX subscriber may roam on a Wi-Fi hotspot with the same credentials. Today this is only possible if the credentials are a username and password, and there is not easy convergence if the credentials are a SIM or certificates. The WISPr EAP-SIM method that was developed suffers the complexity and drawbacks mentioned above. It is foreseeable that in the next few years the explosion in the number of WLAN enabled hotspots and hotspot operators of the last years will continue. Smart clients provide a common user experience that will make it easy for users to access the Internet at these hotspots. There is a great gap to be closed on next generation authentication methods and protocols such as 802.1x to provide improved authentication at the hotspots. There is a present need for a method and protocol that allows mobile network nodes as smart clients to reliably authenticate to the many different access gateways being deployed at hotspots. This method must be capable of working in conjunction with the existing browser-based authentication methods used at hotspots today. The present invention presents a viable solution, which is easily to be implemented by the ISP. The proposed solution meets all these needs for current clients to access gateway integration.

In an embodiment variant, the UAM-based WLAN is implemented by a Wireless Internet Service Provider roaming activation (WISPr), and messages containing authentication data of the mobile network node are transmitted in the Layer 3 protocol layer based on WISPr messages between the Web server and the mobile network node. The mentioned variant has the advantage among other things that does not suffer the complexity and drawbacks of the mentioned WISPr EAP-SIM method. Further the invention has the advantage that with the increasing use of mobile WiMAX, an inter-technology roaming can be provided, so that a WiMAX subscriber may roam on a WLAN hotspot with the same credentials.

In another embodiment variant, binary EAP messages are converted bidirectionally to and from a defined XML character set by means of a coding module, and inserted into the L3 protocol layer, and/or extracted out of the L3 protocol layer by means of the coding module. The conversion can be done for example by means of the coding module on the basis of IEFT Base64 encoding. The mentioned variant has the advantage among other things that provides an easy basis for the encoding and decoding of the EAP-messages in Layer 3 protocol layer. One of the main reasons for doing encoding/decoding can e.g. be that the Layer 3 protocol layer can comprise restriction in terms of what "characters" can be transmitted. For example Base64 encoding converts a binary form in a character stream of A . . . Z and 0 . . . 9. All those characters are "allowed" in XML and the EAP messages can be inserted and extracted in the Layer 3 protocol layer.

In a further embodiment variant, the WISPr XML protocol scheme is extended by means of a reserved data block, as e.g. XML tags, in direction from authenticator to mobile network node, the reserved data block containing the coded EAP messages. In the direction from mobile network node to authenticator, the defined bit sequence transmitted in the Layer 3 protocol layer can for example contain an HTTP POST message and/or HTTP GET message by means of an additional EAP message and/or the EAP message is transmitted in an XML block that is transmitted in the HTTP request. The mentioned variant has the same advantages as the embodiment variants already introduced.

In an embodiment variant, the Web server, if it is triggered by the mobile network node onto a new URL, generates an extended response, the WISPr XML data block being extended by an XML-encoded EAP message. The Web server can for example be triggered by the mobile network node by means of the defined bit sequence containing a HTTP Get message. The mentioned variant has the same advantages as the embodiment variants already introduced.

In another embodiment variant, the mobile network node, acting as EAP peer, generates the EAP response message, encodes it for transmission to the authenticator, and adds it as the parameter of a Login URL of the WISPr XML data block in the defined bit sequence. WISPr can also e.g. be realized, in that the direction mobile node to Web server does not use XML. Information can then e.g. be transmitted in the query parameters of the URL (HTTP GET) or as form parameters (HTTP POST). The Web server, for transmission of an encoded EAP message in the L3 protocol layer, can for example decode it from the defined bit sequence by means of the coding module, and transmits it to the AAA server as an EAP message in a RADIUS request message. The AAA server receiving the RADIUS request message can for example generate an Access Accept RADIUS message or Access Reject RADIUS message or Access Challenge RADIUS and transmits it to the Web server as RADIUS response message. The EAP message of the AAA server can for example be extracted from the RADIUS response message of the AAA server by means of the Web server, and is encoded in an XML response for the defined bit sequence in the Layer 3 protocol layer by means of the coding module and transmitted to the mobile network node. The mentioned variant has the same advantages as the embodiment variants already introduced.

In a further embodiment variant, the WISPr login URL is changed at each new access, the next login URL being determined by the Web server by means of the EAP request message containing a HTTP response message. The mentioned variant has the advantage among other things that the provided security can be enhanced in a fast and easy to be realized way.

DETAILED DESCRIPTION

It should be stressed here that, in addition to the method according to the invention, the present invention also relates to a system for carrying out this method.

Figure 1:
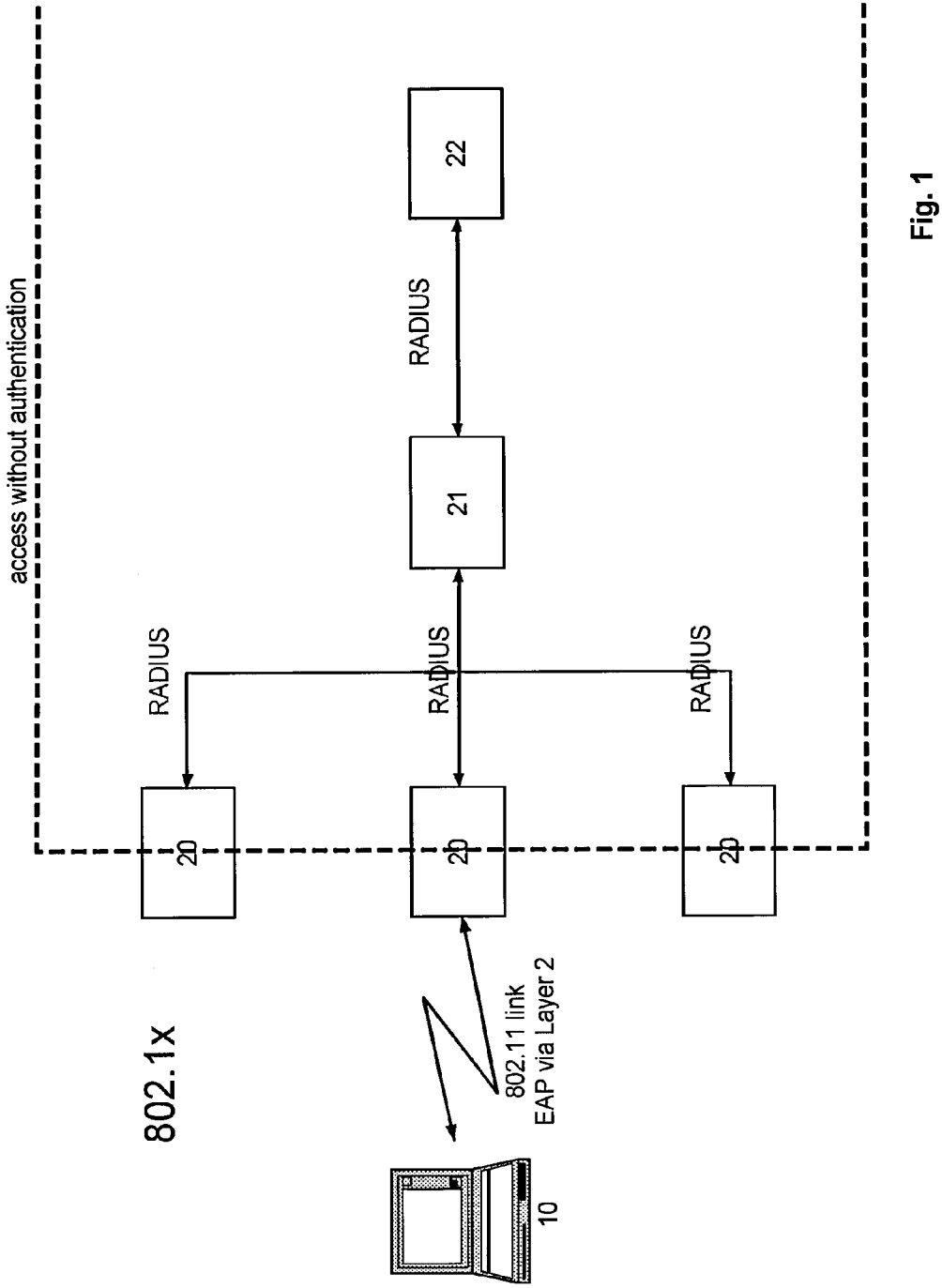
FIG. 1 illustrates a block diagram of an 802.1x-based wireless network with EAP authentication.

Embodiment variants of the present invention will be described in the following with reference to examples. The examples of the embodiments are illustrated by the following enclosed figures:

FIG. 1 shows a block diagram schematically illustrating an 802.1x-based network, with EAP as chosen method for WiMAX authentication. The secure version of the IEEE 802.11 standard, called 802.1x uses EAP as an authentication mechanism. The reference numeral 10 is a mobile network node, the reference numerals 20 are different Access Points (AP), the reference numeral 21 is an Access Server (AS) or Network Access Server (NAS) and the reference numeral 22 an AAA Server. Since there is no possibility of bringing up the Layer 3 protocol layer prior to authentication, there is no IP network access for the mobile node 10 prior to authentication. Very few WLAN hotspot networks deploy 802.1x at the present time because this method inherently prevents a user from purchasing an Internet access via credit card (i.e. it is not possible to offer a UAM access over 802.1x).

Figure 2:
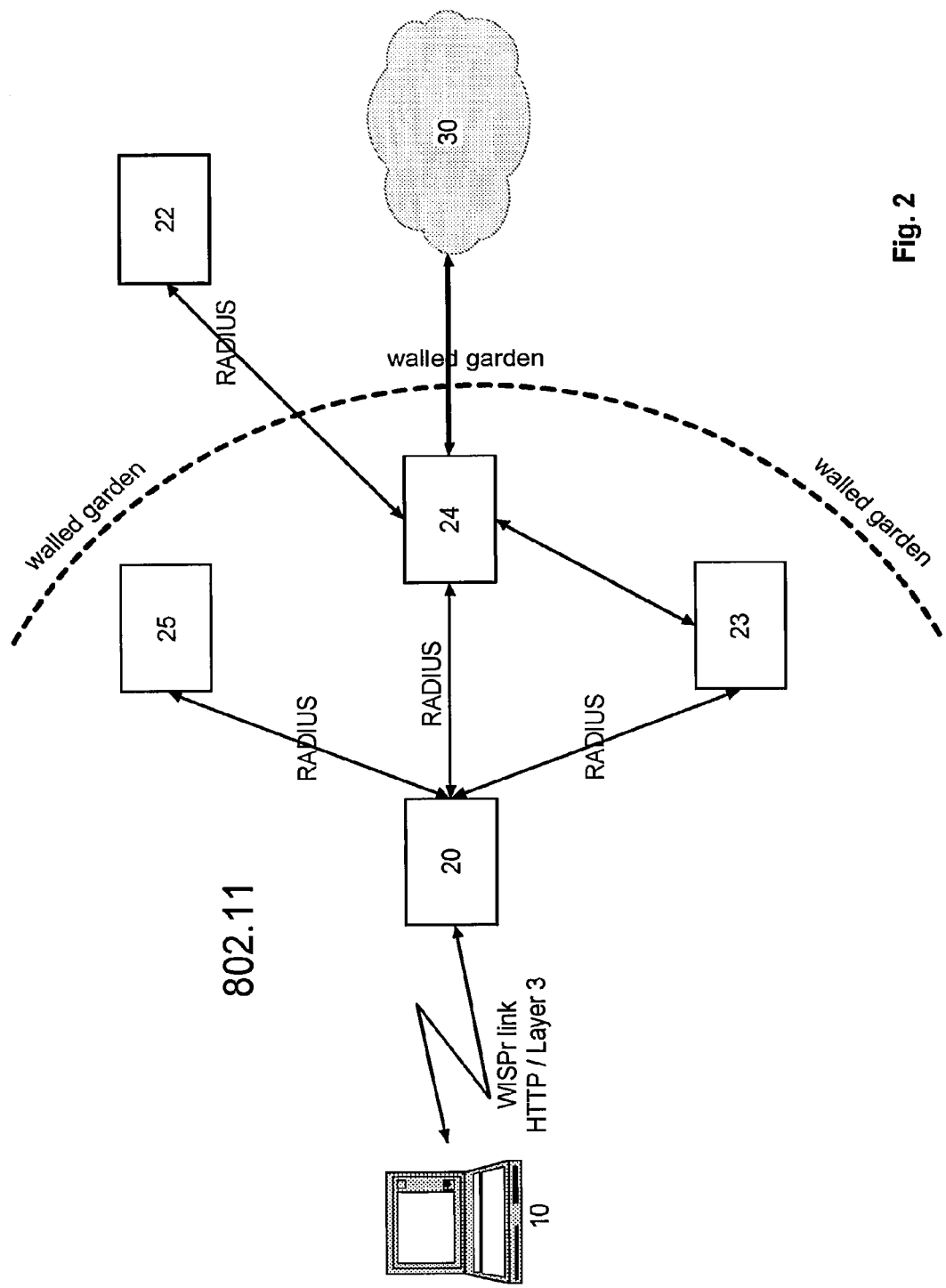
FIG. 2 illustrates a block diagram of an 802.1x-based wireless network with UAM authentication.

FIG. 2 shows a block diagram likewise illustrating schematically UAM authentication to access a wireless network, being based on 802.11. In the concept of a "Walled Garden", the walled garden is a "reversed" intranet that prevents a device connected within the walled garden from accessing the Internet prior to being authenticated. The reference numeral 20 is the Access Point (AP), the reference numeral 10 is the mobile IP node, the reference numeral 23 is the Web Server as captive portal, the reference numeral 24 the NAS (Network Access Server), the reference numeral 25 is the DHCP Server and the reference numeral 22 is the AAA Server. Reference numeral 30 is the known Internet, as worldwide backbone network. This technique, unlike 802.1x, allows the device to bring up all networking layers, including layer 3 (i.e. IP layer) prior to being authenticated and charged for the session. The interest of this technique is that the Web server 23 in the walled garden can be used to perform different types of authentication, including authentication via browser and payment by credit card (not possible with 802.1x). UAM authentication is very popular because of this possibility of paying directly at a hotspot without the need of a subscription.

Figure 3:
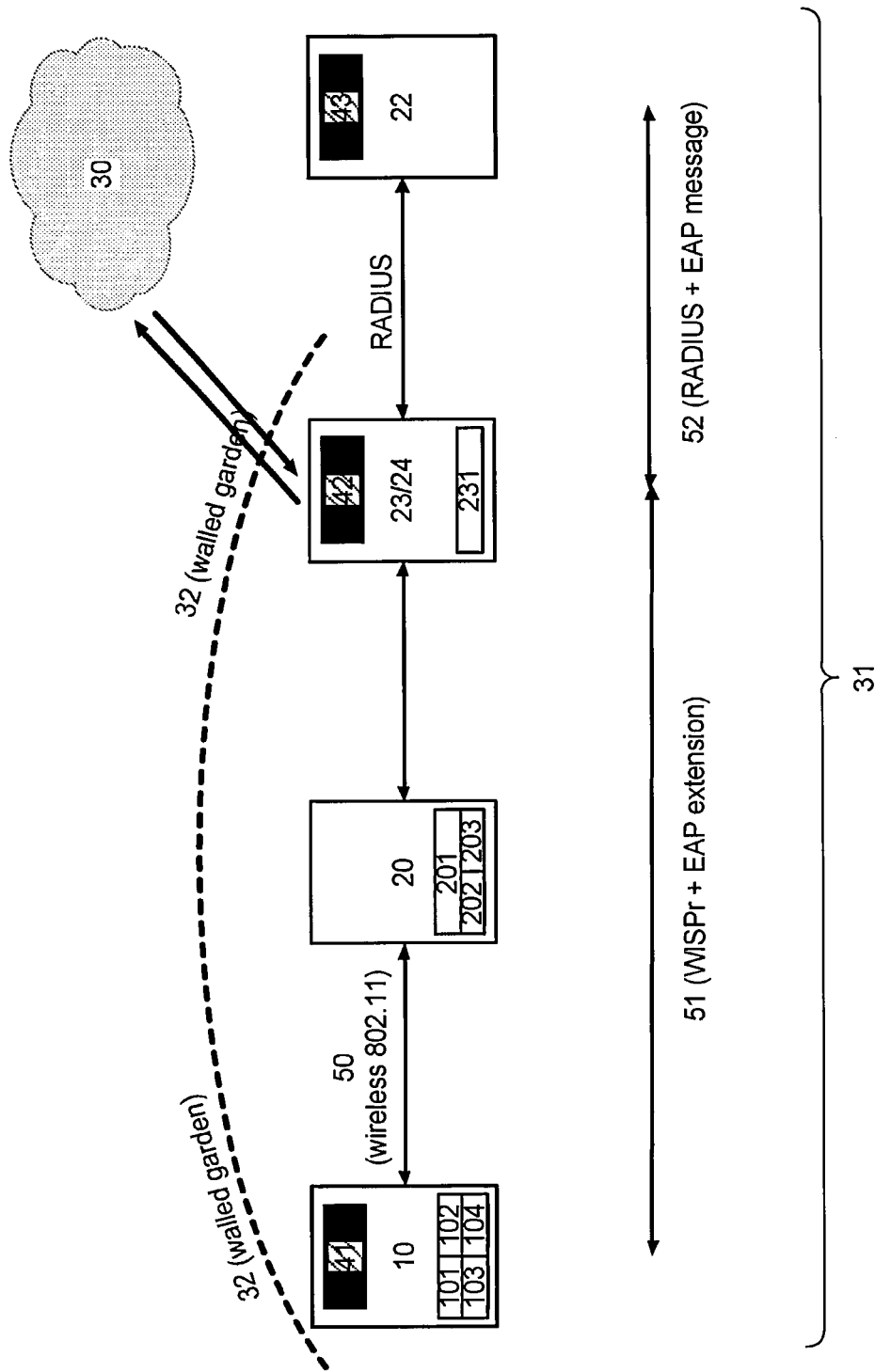
FIG. 3 illustrates a block diagram of a network configuration utilizing an EAP architecture in accordance with the present invention.

FIG. 3 shows a block diagram illustrating schematically the invention, as proposed. As illustrated in FIG. 1, the proposed architecture fulfills the requirements for the EAP architecture. The EAP authenticator 42 is located on the Web server 23 and NAS 24. Please note that the Web server 23 and NAS 24 will in most case be two distinct systems. For the purpose of describing this invention, those two systems 23/24 provide one integrated unit, however. The reference numeral 22 is again the AAA Server and the reference numeral 43 is an EAP server. Further, 10 is the mobile network node or mobile IP node and 41 an EAP Peer. The mobile IP node 10 and the Access Point 20 are connected via a wireless connection by the network interface cards 101/201. However, note, that the connection between the network node 10 and the system does not need to be wireless. The invention also works e.g. for Ethernet. GIS from IPASS works also with nomadic wired access.

Figure 4:
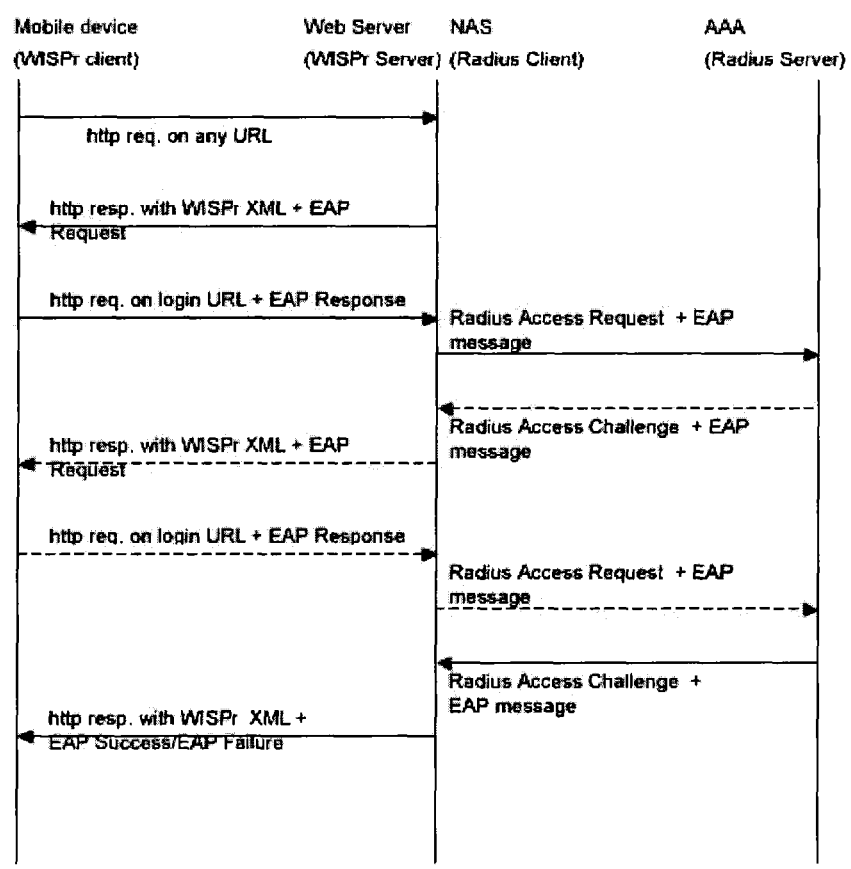
FIG. 4 illustrates an authentication process in accordance with the present invention.

FIG. 4 shows a block diagram illustrating schematically the invention, as proposed. The WISPr protocol is augmented to comprise coded EAP messages. The EAP authenticator 42 is located on the Web server 23/NAS 24. Web server 23/NAS 24 acts as WISPr Server in direction of the WISPr client, i.e. the mobile node/device 10 and in direction of the AAA Server 22 as RADIUS Client. The AAA Server 22 acts as RADIUS Server to the RADIUS client. However, it should be noted that the AAA Server 22 can be realized as one network entity with the NAS 24. The AAA Server 22 comprises an EAP server 43 and the mobile network node 10 an EAP Peer 41.

Figure 5:
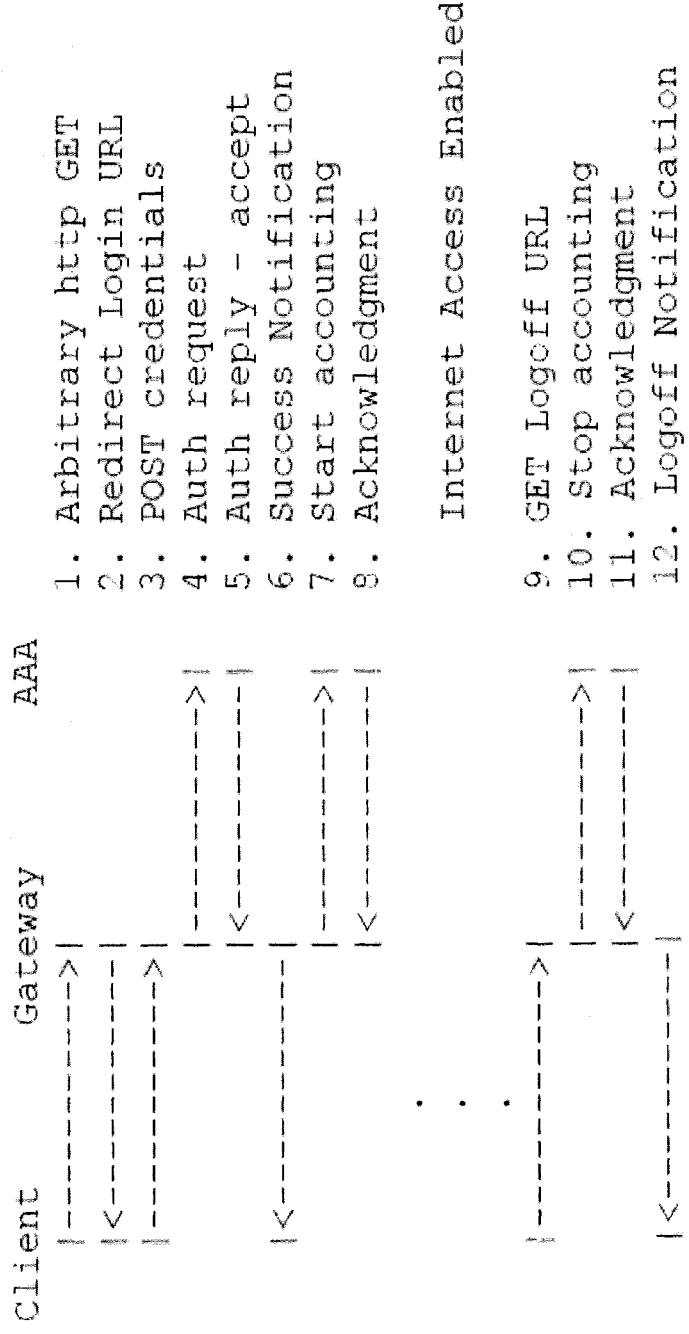
FIG. 5 illustrates an exemplary client login screen utilizing WISPr schema.

FIG. 5 shows a block diagram illustrating schematically the WISPr schema, as Web based login standard method (UAM) for client (cf. FIG. 2). The operating schema was originally released in February 2003 by the WLAN Alliance. The WISPr specification defines the XML scheme used to submit the user credentials, poll for the authentication result, etc. This WISPr Annex D, although it is not longer publicly available on the Wi-Fi Alliance site is a de-facto standard in the Wi-Fi telecom industry. It is estimated that over 90% of the commercial hotspots networks implement WISPr Annex D as an access method. The client (reference numeral 10 in FIG. 2) comprises the client software. The Gateway is the WISPr server 23 on the visited WLAN network. The AAA is the authentication server 22 at the home operator. WISPr defines the leg between Client 10 and Gateway 23/24. The leg between Gateway and AAA is Radius or Diameter.

Figure 6:
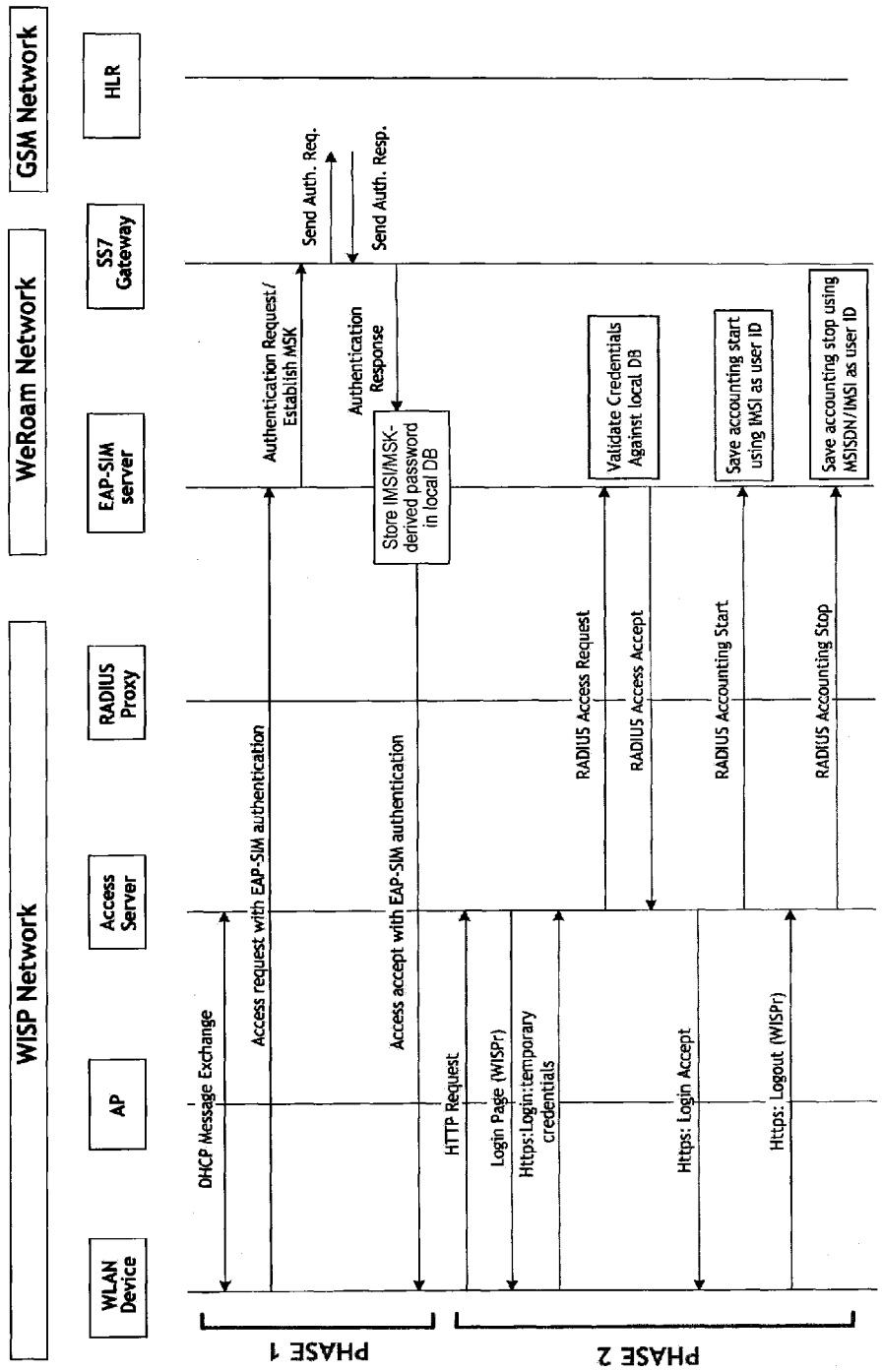
FIG. 6 illustrates an exemplary two-phase WISPr EAP authentication process.

FIG. 6 shows a block diagram illustrating schematically a two-phase WISPr EAP authentication as it was developed by Comfone AG and Service Factory AB in 2004. This technical solution allows an EAP type of authentication over a WISPr enabled hotspot. This solution is a two-phase scheme, with a first phase where EAP authentication proceeds. A one-time username/password is generated out of this phase and the client then proceeds with a normal WISPr login to open the WLAN session. The drawbacks of that technique have already been described above.

FIGS. 3 and 4 illustrate an architecture that can be used to implement the invention. FIG. 3 shows a block diagram illustrating schematically a method and system according to the invention for authenticating a mobile network node 10 in a Wireless Local Area Network (WLAN) 31. The mobile network node 10 comprises a wireless network interface 101, e.g. a wireless network interface card (NIC). However, note, that the connection between the network node 10 and the system does not need to be wireless. The invention also works e.g. for Ethernet. GIS from IPASS works also with nomadic wired access. For authentication, the mobile network node 10 requests via the wireless network interfaces 101/201 access to the WLAN 31 at an Access Point 20. It is important to note, that the invention could also apply to WiMAX. Though, today WiMAX authentication is solely based on EAP, it is imaginable that in future, WiMAX could use the "walled garden" approach. Within a closed first network region 32, also referred to as "Walled Garden", before authentication, all network protocol layers up to the Layer 3 protocol layer (L3) are set up by means of the mobile network node 10. Messages containing authentication data of the mobile network node 10 are transmitted between a Web server 23, which is realized as a captive portal for authenticating mobile network nodes 10 and the mobile network node 10 in the Layer 3 protocol layer using Universal Access Method (UAM). UAM is understood in this application generally as access method for WLANs e.g. based on 802.11. UAM as method can allow a subscriber to access to a WLAN, especially a Wi-Fi network, whereby only an Internet browser is used. The Internet browser opens e.g. with a login page in which the user has to fill in his credentials (usually username and password) before he is granted access to the network. UAM can be further understood as an exchange method of access information over an HTTP (HyperText Transfer Protocol) or HTTPs (Secure HTTP (S-HTTP) protocol layer. All standard transmission of Web pages (HTML over HTTP/HTTPs) falls into this category as well as other methods that can run over HTTP (e.g. XML/SOAP over HTTP/HTTPs). HTTP in this connection is understood as a stateless underlying protocol, which enables to define how messages are formatted and transmitted, and what actions e.g. Web servers and browsers should take in response to various commands. The mentioned HTTPs protocol is understood as an extension to HTTP which allows transmitting data securely over the HTTP layer in the network. E.g. with HTTPs, a secure connection between a client and a server can be created by using e.g. SSL (Secure Sockets Layer) protocol, over which connection any amount of data can be sent securely. Therefore using HTTPs, individual messages can be transmitted securely. If the authorization is successful, a Network Access Server (NAS) 24 enables access for the mobile network node 10 to a second network region 30. The second network region 30 can e.g. be the worldwide backbone network Internet, an Intranet or any other second network region controlled by the Network Access Server 24.

The reference numeral 10 in FIG. 3 pertains to a mobile network node or mobile IP node, which has the necessary infrastructure including hardware and software components at its disposal to achieve a described method and/or system according to the invention. Mobile nodes 10 are to be understood as being, among other things, all possible so-called Customer Premise Equipment (CPE) that is provided for use at various network locations and/or in various networks. These include, for example, all IP-capable devices such as e.g. PDAs, mobile radio telephones and laptops. The mobile CPEs or nodes 10 can have one or more different physical network interfaces 101 that are also able to support a plurality of different network standards. The reference numerals 101/201 are therefore appropriate network interface cards (NICs). The physical network interfaces of the mobile nodes can comprise, for instance, interfaces to WLAN (Wireless Local Area Network), Bluetooth, GSM (Global System for Mobile Communication), GPRS (Generalized Packet Radio Service), USSD (Unstructured Supplementary Services Data), UMTS (Universal Mobile Telecommunications System) and/or Ethernet or another Wired LAN (Local Area Network) etc. The reference number 50 is based on IEEE 802.11, but can comprise different heterogeneous networks such as, for example, a Bluetooth Network, e.g. for installations in roofed-over areas, a mobile radio network with GSM and/or UMTS, etc., a wireless LAN, e.g. based on IEEE wireless 802.1x, but also a wired LAN, i.e. a local fixed network in particular also the PSTN (Public Switched Telephone Network), etc. In principle it is to be said that the method and/or system according to the invention is not tied to a specific network standard, provided that the features according to the invention are present, but can be achieved with any LAN based on a Walled Garden 32 technical structure. The interfaces 101 of the mobile network node 10 can not only be packet-switched interfaces such as are used directly by network protocols such as e.g. Ethernet or Token Ring, but can also be circuit-switched interfaces that can be used with protocols such as PPP (Point to Point Protocol, see IETF RFC), SLIP (Serial Line Internet Protocol) or GPRS (Generalized Packet Radio Service), i.e. those interfaces for example that do not have a network address such as a MAC or a DLC address. As partially mentioned before, the communication can, for example, take place over the LAN for instance by means of special short messages, e.g. SMS (Short Message Services), EMS (Enhanced Message Services), over a signaling channel such as e.g. USSD (Unstructured Supplementary Services Data) or other technologies, like MExE (Mobile Execution Environment), GPRS (Generalized Packet Radio Service), WAP (Wireless Application Protocol) or UMTS (Universal Mobile Telecommunications System), or over IEEE wireless 802.1x or via another user information channel. The mobile network node 10 is a mobile IP node, which can comprise a mobile IP module and/or an IPsec module. The main task of the mobile IP consists of authenticating the IP node 10 or the user of the IP node 10 in the IP network and of correspondingly rerouting the IP packets that have the mobile node 10 as the destination address. For further mobile IP specifications, also see for example IETF (Internet Engineering Task Force) RFC 2002, IEEE Comm. Vol. 35 No. 5 1997, etc. Mobile IP especially supports IPv6 and IPv4. The mobile IP capabilities can preferably be combined with the security mechanisms of an IPsec (IP security protocol) module to guarantee secure mobile data management in the public Internet. IPsec (IP security protocol) generates authentication/confidentiality mechanisms packet-wise or socket-wise between network hubs that both utilize IPsec. One of the flexibilities of IPsec lies especially in that it can be configured packet-wise as well as for individual sockets. IPsec supports IPvx, especially IPv6 and IPv4. For detailed IPsec-Specifications refer, for example, to Pete Loshin: IP Security Architecture; Morgan Kaufmann Publishers; November 1999 or A Technical Guide to IPsec; James S et al.; CRC Press, LLC; December 2000, etc. Although IPsec is used in this embodiment example as an example in describing the use of security protocols on the IP level, all other possible security protocols or security mechanisms or even the omission of security protocols are conceivable according to the invention.

An authenticator 42 based on Extensible Authentication Protocol (EAP, defined at the IETF, see IETF RFC 4648) is generated on the Web server 23 and/or network access server 24. The Access Point 20 can comprise an appropriate Access Point Port Access Entity (PAE) 202 and/or not authorized ports 203. It is to be noted, that in a system realization based upon 802.1x the port control is done on the Access Point 20, where in a system realization based on EAP over WISPr, the port control is done on the NAS 24. The Layer 3 protocol layer is extended bidirectionally by means of a defined bit sequence containing encoded EAP messages between the authenticator 42 and the mobile network node 10, which comprises an EAP peer 41 and a Client Port Access Entry (PAE) 103. Medium access to the network can e.g. be generated in the Layer 2 protocol layer (L2), and access to the physical Layer 1 (L1) can e.g. be generated based on an 802.11 WLAN network 31. The Layer 3 protocol layer can be generated as a WISPr protocol layer. In case of an access request by the mobile network node 10, the Web server 23 transmits an authentication stimulus to the mobile network node 10 by encoding an EAP message request for the Layer 3 protocol layer by means of a coding module 231 and transmitting the encoded message request in the Layer 3 protocol layer by means of the defined bit sequence. The mobile network node 20 decodes the EAP message request by means of a coding module 104 from the defined bit sequence and transmits in the Layer 3 protocol layer, by means of the defined bit sequence an encoded EAP response message to the authenticator 42. The EAP response message comprises authentication data of the mobile network node 10. The authentication data can e.g. comprise an identity (ID) reference and/or password and/or hash value and/or IMSI of a SIM card 102. The Web server 23 decodes the EAP response message from the bit sequence by means of the coding module 231 and transmits it to an AAA server 22 comprising an EAP server 43 by means of an authentication inquiry. The authentication inquiry between the Web Server 23 and the AAA Server 24 can e.g. be realized by a RADIUS or DIAMETER protocol layer. On the basis of an authentication response by the AAA Server 22, the Network Access Server 24 enables the second network region 30 for use by the mobile network node 10.

The UAM-based WLAN 31 can be realized as a Wireless Internet Service Provider roaming network (WISPr), wherein the messages containing authentication data of the mobile network node 10 are transmitted in the Layer 3 protocol layer based on WISPr messages between the Web server 23 and the mobile network node 10. By means of a coding module 104/231, binary EAP messages are converted bidirectionally to and from a defined XML character set, and inserted into the L3 protocol layer, and/or extracted out of the L3 protocol layer by means of the coding module 104/231. The conversion can e.g. be done by means of the coding modules 104/231 on the basis of IEFT Base64 encoding (see IETF RFC 4648). In the direction from authenticator 42 to mobile network node 10 comprising the EAP peer 41, the WISPr XML protocol scheme can e.g. be extended by means of a reserved data block, the reserved data block containing the coded EAP messages. Likewise, in the direction from the peer 41 of the mobile network node 10 to the authenticator 42, the defined bit sequence transmitted in the Layer 3 protocol layer can e.g. contain an HTTP POST message and/or HTTP GET message by means of an additional EAP message. WISPr can e.g. also be realized, in that the direction mobile node 10 to Web server 23 does not use XML. Information is transmitted in the query parameters of the URL (HTTP GET) or as form parameters (HTTP POST). The Web server 23, if it is triggered by the mobile network node 10 onto a new URL, can e.g. generate an extended response, the WISPr XML data block being extended by an XML-encoded EAP message. The Web server 23 can e.g. be triggered by the mobile network node 10 by means of the defined bit sequence containing a HTTP Get message. The mobile network node 10 comprising the EAP peer 41 can e.g. generate the EAP response message, and encode it by means of the coding module 104 for transmission to the authenticator 42, and add it as the parameter of a Login URL of the WISPr XML data block in the defined bit sequence. The Web server 23 can e.g. decode the EAP message from transmission in the L3 protocol layer from the defined bit sequence by means of the coding module 231, and transmits it to the AAA server 22 as an EAP message in a RADIUS request message. The AAA server 22 receiving the RADIUS request message can e.g. generate an Access Accept RADIUS message or Access Reject RADIUS message and transmit it to the Web server 23 as RADIUS response message. The EAP message of the AAA server 22 can e.g. be extracted from the RADIUS response message of the AAA server 22 by means of the Web server 23, and can e.g. be encoded in an XML response for the defined bit sequence in the Layer 3 protocol layer by means of the coding module 231 and transmitted to the mobile network node 10. As an additional embodiment variant, the WISPr login URL can e.g. be changed at each new access, the next login URL being determined by the Web server 23 by means of the EAP request message containing a HTTP response message. In this context, as a special embodiment variant, the client or mobile node 10 can also e.g. receive two or even a plurality of login URLs where one of them is for normal username/password.

As illustrated in FIG. 3, the proposed architecture implement fulfills the EAP architecture. The EAP authenticator 42 is located on the Web server 23 and NAS 24. It is important to note that the Web server 23 and NAS 24 will in most case be two distinct systems. For the purpose of describing this invention, those two systems provide one integrated unit, however. As part of the invention, the WISPr protocol is augmented to include EAP messages (see FIG. 4). The EAP authenticator 42 is located on the Web server 23/NAS 24. Web server 23/NAS 24 acts as WISPr Server in direction of the WISPr client, i.e. the mobile node/device 10, and in direction of the AAA Server 22 as RADIUS Client. The AAA Server 22 acts as RADIUS Server to the RADIUS client. The AAA Server 22 includes an EAP server 43, and the mobile network node 10 an EAP Peer 41. The said defined bit sequence is created as an additional field to carry an encoded EAP message in both directions. The encoding and decoding can be done by appropriate coding modules 104/231 of the mobile network node 10 and the Web Server 23, respectively. A possible encoding of the EAP packet is the IETF Base64 encoding. Encoding is necessary because EAP is a binary format and XML has a restricted character set. With a Base64 encoding, the bytes of the EAP packet can be transmitted while respecting the character set of XML. The WISPr protocol is also augmented. In the direction Authenticator 42 to Peer 41, the WISPr XML scheme is extended by the defined bit sequence to include a new field that contains the encoded EAP message (e.g. <eap> . . . </eap>). In the direction Peer 41 to Authenticator 42, an additional variable (e.g. EAP= . . . ) as defined bit sequence is posted in the form when doing the HTTP POST. This parameter could also be added to the list of the URL query parameters in case an HTTP GET is performed instead of an HTTP POST. Given the length of the EAP message, this may however cause problems. WISPr is today specified to use a POST.

The WISPr server 23, when triggered by an HTTP Get on an arbitrary URL will in the WISPr XML block that it returns to the mobile network node 10 include an encoded EAP Request message. The mobile network node 10, acting as EAP Peer 41 produces an EAP-Response that is encoded for transport and transmitted back as a parameters in the Login URL that was passed in the WISPr XML block. The WISPr server 23 receiving the EAP encoded message will decode the packet (i.e. transform it back to binary) and send it as an EAP message in the Radius request toward the AAA Server 22. Today the WISPr server extracts the username/password and sends it in the proper attribute of the Radius request (e.g. Username and User-Password Radius attributes). The AAA server 22 may send an Access Challenge back that is then encoded and transmitted in the HTTP response back to the peer. The latter then sends an EAP Response back to the EAP Authenticator 42 using an HTTP request on the login URL. More iterations of Challenge/Request may happen. Finally, the AAA Server 22 sends back either an Access Accept, Access-Reject Radius message. This Radius message may contain an EAP message. If such an EAP message is present, the WISPr server 23 extracts it from the Radius message, encodes it to be transportable over XML and puts it in the XML response sent back to the client software on the mobile device 10.

The polling defined in the WISPr specification works the same way with this EAP extension as with the current WISPr 1.0. The WISPr Login URL may be different at each iteration. The next login URL is indicated by the WISPr server 23 in the HTTP response that contains the EAP Request. While rather simple, this method opens up the possibility of an EAP authentication method over an XML based UAM (support for SIM 102, certificates authentication). It is rather straightforward to implement such an extension in a client software that already supports WISPr. It also requires minimum changes on the infrastructure of the hotspot operator and can be used as an alternative to a costly upgrade of their infrastructure to a dual 802.11 and 802.1x. With this invention, WISPr becomes another transport protocol for EAP messages. Convergence with WiMAX becomes then straightforward as all EAP authentication schemes are then supported. Although WISPr is the primary target of this invention, this invention can apply to any UAM based login method.

EAP is designed to run over a link layer (layer 2). All link layers have a maximum MTU (Maximum Transmission Unit) size. The MTU gives the largest physical packet size, measured in bytes, that a network can transmit. Any messages larger than the MTU are divided into smaller packets before being sent. Usually, every network has a different MTU, which can be set by the network administrator. The mobile network node 10 can set the MTU. This defines the maximum size of the packets sent from your computer onto the network. Ideally, the MTU can be set to be the same as the smallest MTU of all the networks between the node and a message's final destination. Otherwise, if messages are larger than one of the intervening MTUs, they will get broken up (fragmented), which slows down transmission speeds. Certain EAP methods such EAP-TLS can produce rather big messages. Such messages must be fragmented prior to transmission as the link layer is not capable of fragmentation and re-assembly. The peer 41 and EAP server 22 are responsible for the fragmentation prior to transmission and re-assembly at reception. In the present invention, the fragmentation can remain at the peer 41 and EAP server 22 or the fragmentation and re-assembly can occur at the NAS 24. In the latter scenario, the EAP peer 41 sends a complete EAP message to the Web server 23, irrespective of the size of the message (HTTP provides supports for very large messages). The NAS 24 will then fragment the message based on its knowledge of the MTU size (configured value, or auto-detection). The NAS 24 runs the portion of the EAP Finite State Machine that handles the fragmentation and re-transmission. When the AAA Server 22 sends fragments of an EAP message, the NAS 24 acknowledges those fragments and rebuilds the entire message that is delivered to the device via the HTTP response. As fragmentation is EAP method dependent, to perform fragmentation and re-assembly, the NAS 24 must be EAP method aware.

The EAP Identity request initiated by the Web Server 23 and NAS 24 toward the peer 41 can be transported in the Initial Redirect Message of WISPr or in any subsequent message. The former option is preferred as it optimizes the communication and can be used as an indicator that the hotspot supports EAPoWISPr authentication. The EAP structure specifies that the Authenticator (i.e. NAS 24) triggers the request for identity. As an embodiment variant, the mobile node can e.g. send a trigger for EAP. This trigger contains already its identity. Instead of the NAS 24 asking again for the identity of the mobile network node 10 (as per EAP RFC), the authenticator may request a challenge directly (it can e.g. basically use the identity that was provided by the mobile node in the original request). In one embodiment variant, the hotspot may return a separate URL to be used for WISProEAP authentication. Another implementation may use the normal WISPr Login URL parameters to indicate where the peer 41 must post the EAP response. The proposed inventive solution comprising the described XML handshake for WISPr is not known in either way in the state of the art.

It also is important to note that the Web server 23 decoding the EAP response message from the bit sequence and transmitting it to the AAA server 22 by means of an authentication request, where as the authentication request can e.g. comprise several rounds of RADIUS challenge/request until the AAA Server 22 accepts or reject the authentication. On the basis of an authentication response by the AAA Server 22, access is enabled to the second network region 30 for use by the mobile network node 10 by means of the Network Access Server 24.

LIST OF REFERENCES

10 Mobile network node
101 Network interface (NIC)/wireless network interface
102 SIM Card
103 Client Port Access Entity (PAE)
104 Coding module
20 Access Point
201 Wireless network interface (NIC)
202 Access Point Port Access Entity (PAE)
203 Not authorized Port
21 Access Server
22 AAA Server
23 Web Server
231 Coding module
24 Network Access Server (NAS)
25 DHCP Server
30 Internet or second network region
31 Wireless Local Area Network
32 Walled garden or first network region
41 EAP Peer
42 EAP Authenticator
43 EAP Server
50 Wireless connection via a WLAN (e.g. wireless 802.11)
51 WISPr with EAP extension
52 RADIUS with EAP message
L1 Layer 1 protocol layer/physical layer
L2 Layer 2 protocol layer/MAC layer
L3 Layer 2 protocol layer/TCP/IP layer

The invention claimed is:

1. A method of authenticating a mobile network node in a network, wherein via a network interface, the mobile network node requests access to the network at an access point, the method comprising:

generating an authenticator based on Extensible Authentication Protocol (EAP) on a Webserver or on a network access server, a Layer 3 (L3) protocol layer between the authenticator and the mobile network node comprising an EAP peer being extended bidirectionally by a defined bit sequence containing encoded EAP messages;

in case of an access request by the mobile network node, the authenticator transmitting an authentication stimulus to the mobile network node by encoding an EAP message request for the L3 protocol layer by a coding module of the authenticator and transmitting the encoded EAP message request in the L3 protocol layer by the defined bit sequence, wherein messages containing authentication data of the mobile network node are transmitted in the L3 protocol layer based on a Wireless Internet Service Provider roaming (WISPr) XML protocol scheme between the authenticator and the mobile network node, and the WISPr XML protocol scheme is extended by a reserved data block containing the coded EAP messages in a direction from the authenticator to the mobile network node including the EAP peer;

the mobile network node decoding the EAP message request from the defined bit sequence and transmitting an encoded EAP response message in the L3 protocol layer by the defined bit sequence to the authenticator, the EAP response message comprising authentication data of the mobile network node; and the authenticator decoding the EAP response message from the bit sequence, transmitting the authentication data of the mobile network node to an Authentication, Authorization, and Accounting (AAA) Server comprising an EAP server by an authentication request or multiple authentication challenges/requests, wherein within a closed first network region including the mobile network node, the access point, the Webserver, and the authenticator, before authentication by the mobile network node, all network protocol layers up to the L3 protocol layer are set up, and messages containing authentication data of the mobile network node are transmitted in the L3 protocol layer using a Universal Access (UAM) method.

2. The method of authenticating a mobile network node according to claim 1, wherein the network is a Wireless Local Access Network (WLAN) or GSM-network.

3. The method of authenticating a mobile network node according to claim 1, wherein an authentication inquiry between the authenticator and the AAA Server is a RADIUS or DIAMETER protocol layer.

4. The method of authenticating a mobile network node according to claim 1, wherein
the WLAN is UAM-based and is realized by WISPr activation, and
the messages containing authentication data of the mobile network node are transmitted in the L3 protocol layer based on the WISPr XML protocol scheme between the Web server and the mobile network node.

5. The method of authenticating a mobile network node according to claim 1, wherein the authentication data comprises at least one of an identity (ID) reference, a password, a hash value or a reference IMSI of a SIM card.

6. The method of authenticating a mobile network node according to claim 1, wherein medium access is generated in a Layer 2 protocol layer (L2), and access to a physical Layer 1 (L1) is generated based on an 802.11 WLAN network.

7. The method of authenticating a mobile network node according to claim 1, wherein the L3 protocol layer is based on the WISPr XML protocol scheme.

8. The method of authenticating a mobile network node according to claim 1, further comprising, by the coding module, converting bidirectionally binary EAP messages to and from a defined XML character set, and inserting or extracting the binary EAP messages into or out of the L3 protocol layer.

9. The method of authenticating a mobile network node according to claim 8, wherein the converting is based on IEFT Base64 encoding.

10. The method of authenticating a mobile network node according to claim 1, wherein, in a direction from the authenticator to the mobile network node comprising the peer, the WISPr XML protocol scheme is extended by a reserved data block, the reserved data block containing the coded EAP messages.

11. The method of authenticating a mobile network node according to claim 10, further comprising, by the mobile network node, generating the EAP response message, encoding the EAP response message for transmission to the authenticator, and adding the EAP response message as the parameter of a Login URL of the WISPr XML data block in the defined bit sequence.

12. The method of authenticating a mobile network node according to claim 1, wherein in the direction from the peer of the mobile network node to the authenticator, the defined bit sequence transmitted in the L3 protocol layer is containing an HTTP POST message or an HTTP GET message by an additional EAP message, or the EAP message is transmitted in an XML block that is transmitted in the HTTP request.

13. The method of authenticating a mobile network node according to claim 1, wherein when the Web server is triggered by the mobile network node onto a new URL, the Web Server generates an extended response, the WISPr XML data block being extended by an XML-encoded EAP message.

14. The method of authenticating a mobile network node according to claim 13, wherein the Web server is triggered by the mobile network node by the defined bit sequence containing a HTTP Get message.

15. The method of authenticating a mobile network node according to claim 1, further comprising, from transmission of a encoded EAP message in the L3 protocol layer, the Web server decoding the encoded EAP message from the defined bit sequence, and transmitting the EAP message to the AAA server as an EAP message in a RADIUS request message.

16. The method of authenticating a mobile network node according to claim 15, further comprising, the AAA server receiving the RADIUS request message, generating an Access Accept RADIUS message or Access Reject RADIUS message or Access Challenge RADIUS message, and transmitting the generated message to the Web server as a RADIUS response message.

17. The method of authenticating a mobile network node according to claim 16, wherein the EAP message of the AAA server is extracted from the RADIUS response message of the AAA server by the Web server, and is encoded in an XML response for the defined bit sequence in the L3 protocol layer by the coding module and transmitted to the mobile network node.

18. The method of authenticating a mobile network node according to claim 15, wherein the WISPr login URL is changed at each new access, the next login URL being determined by the Web server by the EAP request message containing a HTTP response message.

19. The method of authenticating a mobile network node according to claim 15, wherein the mobile network node receives two or a plurality of login URLs, where one of the login URLs is for normal username/password authentication.

20. A system for authenticating a mobile network node in a network, wherein, for access to the network, the mobile network node includes a wireless network interface, the system comprising:
a closed first network region including the mobile network node, a Webserver, and an authenticator, in which, before authentication by the mobile network node, all network layers up to Layer 3 protocol layer (L3) are set up, and messages containing authentication data of the mobile network node are transmitted in the L3 protocol layer based on a Universal Access (UAM) method, wherein the closed first network region further includes a network access server that enables access for use by the mobile network node to a second network region based on whether authorization of the mobile network node is successful;
the Webserver or the network access server comprises the authenticator based on an Extensible Authentication Protocol (EAP) and the L3 protocol layer between the authenticator and the mobile network node comprising an EAP peer is extended bidirectionally by a defined bit sequence containing encoded EAP messages;
in the L3 protocol layer in case of an access request by the mobile network node before authentication, the defined bit sequence in the L3 protocol layer comprises an encoded EAP request message as an authentication stimulus encoded by a coding module of the authenticator;
the mobile network node further comprises a coding module to decode the encoded EAP request message from the defined bit sequence and to encode an EAP response message comprising authentication data to be transmitted by the mobile network node in the defined bit sequence in the L3 protocol layer to the authenticator; and
the coding module of the authenticator decodes the transmitted EAP message response from the bit sequence and transmits the authentication data of the mobile network node to an Authentication, Authorization, and Accounting (AAA) Server by an authentication inquiry, and the Webserver or the network access server activates the network access server based on a received authentication response of the AAA Server, enabling access to the second network region for the mobile network node, wherein
messages containing authentication data of the mobile network node are transmitted in the L3 protocol layer based on a Wireless Internet Service Provider roaming (WISPr) XML protocol scheme between the authenticator and the mobile network node, and the WISPr XML protocol scheme is extended by a reserved data block containing the coded EAP messages in a direction from the authenticator to the mobile network node including the EAP peer.

21. The system according to claim 20, wherein the network is a Wireless Local Access Network (WLAN) or GSM-network.

22. The system according to claim 20, wherein the UAM-based WLAN network is a WISPr-activated network.

23. The system according to claim 20, wherein the EAP message coding in the L3 protocol layer between the authenticator and the mobile network node comprises XML encoding of the binary EAP messages.

* * * * *